United States Patent

[11] 3,602,718

[72] Inventor: Maurice B. Michon
     Draveil, France
[21] Appl. No.: 829,625
[22] Filed: June 2, 1969
[45] Patented: Aug. 31, 1971
[73] Assignee: Compagnie Generale D'Electricite
     Paris, France
[32] Priority: May 31, 1968
[33] France
[31] PV 153634

[54] MEANS FOR MEASURING THE DURATION OF VERY SHORT LIGHT PULSES, SUCH AS LASER PULSES
13 Claims, 8 Drawing Figs.

[52] U.S. Cl. ................................. 250/216,
     235/181, 250/217, 250/220, 350/163
[51] Int. Cl. .................................................. H01j 3/14
[50] Field of Search .......................................... 350/163,
     3.5; 250/216, 217, 220; 235/187

[56] References Cited
OTHER REFERENCES

Giordmaine, J. A. et al. " Two-Photon Excitation of Fluorescence by Picosecond Light Pulses," Applied Physics Letters, Vol. 11, No. 7, Oct. 1, 1967, pp. 216–218

Hubbard, W. M. " A Method for Measurement of the Duration of Picosecond Pulses by Beat-Frequency Detection of Laser Output," 1969 IEEE, Conference on Laser Engineering and Applications. May 28, 1969, Catalog No. 69627-Laser pp. 20-21

Rentzepis, P. M. et al. " Picosecond Light Pulse Display Using Two Different Optical Frequencies" Applied Physics Letters, Vol. 11, No. 7, Oct. 1, 1967 pp. 218–220

Primary Examiner—James W. Lawrence
Assistant Examiner—C. M. Leedom
Attorney—Sughrue, Rothwell, Mion, Zinn & MacPeak ABSTRACT: Automatic device for measuring the duration of a very short light pulse, such as a laser pulse, by a correlation procedure from two "half pulses" including two lines; each provoking a different optical delay.

MEANS FOR MEASURING THE DURATION OF VERY SHORT LIGHT PULSES, SUCH AS LASER PULSES

BACKGROUND OF THE INVENTION

1. Field of the Invention

The present invention relates to a means for measuring the duration of very short light pulses, and more particularly those light pulses emitted by a laser.

2. Description of the Prior Art

Particularly in the sphere of telemetry, it is necessary to obtain light pulses of very short duration. Such pulses are obtained, particularly with certain triggered lasers. For this purpose, a "saturable absorbent" element is placed in the cavity of the laser head, which element only allows the light to pass when the energy incident on the element is sufficient, and which has a very short life, i.e. it quickly becomes opaque again. The light pulse times currently obtained with such arrangements are of the order of a picosecond.

At the outlet of a laser in which is positioned such an arrangement (known generally under the name of "DYE") a pulse train is obtained. Each pulse is separated from adjacent pulses by a constant time interval $2L/c$, L designating the length of the laser cavity and "c" the speed of light; this time "$t$" is the duration of the outward and return passage of a pulse in the cavity.

Knowing this time interval, it is easy to isolate a pulse from the pulses forming a train. By way of example, a photomultiplier can be positioned at the outlet from the cavity, said photomultiplier providing an electric signal corresponding to one of the first pulses which emerges from the cavity. Through a delay line, this electric signal can control an electronic system supplying a voltage pulse which controls an electrooptical cell placed in or externally of the aforesaid cavity, which in addition comprises a polarizer and a GLAN prism.

The moment of departure of the voltage pulse and its duration are such that a single light pulse of the train is deviated by the GLAN prism. These arrangements are known and used at the present time in industry.

Having obtained a light pulse of very short duration, it is necessary to be able to measure the duration. It is known to measure the duration of very short light pulses by a correlation method. For this purpose an arrangement is employed comprising first a separator which divides the light pulse into two parts which are equal but of the same duration, and second two reflectors, one of which is fixed and the other is movable, this latter being capable of being moved parallel to itself. These two reflectors are so positioned in relation to the separator that the half-pulses, after reflection on the said reflectors, are recombined at the outlet of the separator. Such a prior art arrangement is shown in FIG. 1. It comprises a separator 1, such as a semitransparent plate, and two reflecting mirrors 2 and 3, such as totally reflecting prisms or mirrors, one of these reflectors being movable.

Disposed between the separator 1 and the fixed mirror 2 is a plate known as a "quarter-wave" plate, causing a shift in phase by $\lambda/4$ ($\lambda$ representing the wavelength 4 of the light forming the pulse), which causes the polarization plane to turn through $\pi/2$ for a double passage of the light through the plate.

The arrangement according to FIG. 1 comprises a detector which is formed by a KDP ($KH_2PO_4$) crystal 4, which gives a harmonic signal, of which the frequency is twice that of the emitted light and of which the amplitude is proportional to the product of the electric field of the parts common to the two light half-pulses.

A rectilinearly polarized light pulse 5, emitted for example by a laser, is separated into two equal parts by the plate 1. One half-pulse 5 is directed on to the fixed mirror 2 and a second half-pulse 7 is directed on to the movable mirror 3.

The pulses 6 and 7, after reflection on the mirrors 2 and 3, are returned onto the same optical path at the outlet from the plate 1 and penetrate into the KDP crystal 4. When the optical paths between the plate 1 and the mirrors 2 and 3 are equal, the two pulses 6 and 7 reach the KDP crystal 4 simultaneously. On the other hand, since the half-pulse 6 has passed twice through the plate 9, its polarization plane has under gone a rotation of $\pi/2$, i.e., a shift in phase of $\mu/2$.

The two half-pulses with orthogonal polarization plane which simultaneously reach the KDP crystal 4 produce a harmonic light emission of double frequency, of which the amplitude is proportional to the product of the electric fields of the two half-pulses (for this purpose, it is necessary to suitably arrange the crystallographic axis of the KDP crystal 4). The light radiation at the outlet of the crystal 4 can for example be received by a photomultiplier 8.

By slight displacement of the movable mirror 3 parallel to its mirror plane, a shift in the two half-pulses reaching the KDP crystal 4 is obtained The energy of the harmonic emitted by this crystal is solely a function of the part common to the said half-pulses. By proceeding in successive steps, there is obtained a series of values of the amplitude of the emission of the harmonic at the outlet of the crystal, this being the case until emission of the harmonic 2 is no longer obtained, that is to say, until one pulse have been shifted entirely in relation to the other and they no longer have a common part.

FIG. 2 is a diagram illustrating the known method of measurement by correlation, that is to say, showing the distribution of the two half-pulses 6 and 7 for successive positions of the movable mirror, and the value 10 of the amplitudes of the double harmonic corresponding to the product of the common part of the half-pulses.

Thus, the indication of the duration of a pulse is obtained by dividing the amplitude of the mirror displacement by the speed of the light. By extrapolating between the points which are determined experimentally, it is possible to know the amplitude of the pulse at different levels, for example, at midheight.

Such an arrangement is described in greater detail by Weber in an article in "JOURNAL OF APPLIED PHYSICS" Volume 38, No. 5, Apr. 1967, under the title of "Method for Pulsewidth Measurement of Ultrashort Light Pulses generated by phase locked Lasers using nonlinear Optics."

It is also known to achieve such detection by directly receiving the two pulses on a photomultiplier. In this case, it is not polarized light which is used, but on the contrary, for effecting a correct measurement, it is necessary to displace the mirror by a quantity each time equal to a multiple of the wavelength, in order that the common parts of the two light pulses are in phase.

In order to carry out a measurement with the known arrangement as described above, it is necessary to effect an emission of several pulses, and it is never certain that they all have the same duration and intensity. Another disadvantage of this arrangement is that it is necessary to displace the movable mirror for each analysis point. Furthermore, in the case of a detection obtained directly by the product of the two half-pulses on a photosensitive cell, the displacement of the mirror must be strictly a multiple of the wavelength of the light pulse of which it is desired to measure the duration.

SUMMARY OF THE INVENTION

The present invention overcomes these disadvantages and is concerned with means permitting the measurement of the duration of very short light pulses by the correlation method from an initial pulse split up into two light half-pulses, characterized in that it comprises two lines each causing a different optical delay and producing, from the initial pulse or two half-pulses reaching the said lines, two series of secondary pulses of equal duration to that of the initial pulse. Each pulse of the first series is shifted in relation to the corresponding pulses of the second series by a quantity proportional to the difference of the optical delays caused by the lines.

Such an arrangement provides certain advantages by comparison with the known arrangements. The measurement can be carried out with a single pulse and in a completely automatic manner without having to interpose, at the moment of the measurement by correlation, a mechanical movement which can only introduce errors, of which the values cannot be evaluated. On the other hand, in the case where the detection of pulses of two outlet trains is effected directly on a photomultiplier, it is sufficient to provide a correct initial adjustment, that is to say, the optical path difference of the two lines has to be proportional to the half wavelength of the light being used. There is then obtained a final adjustment for each measurement point.

DESCRIPTION OF THE PREFERRED EMBODIMENTS

Figure 1:
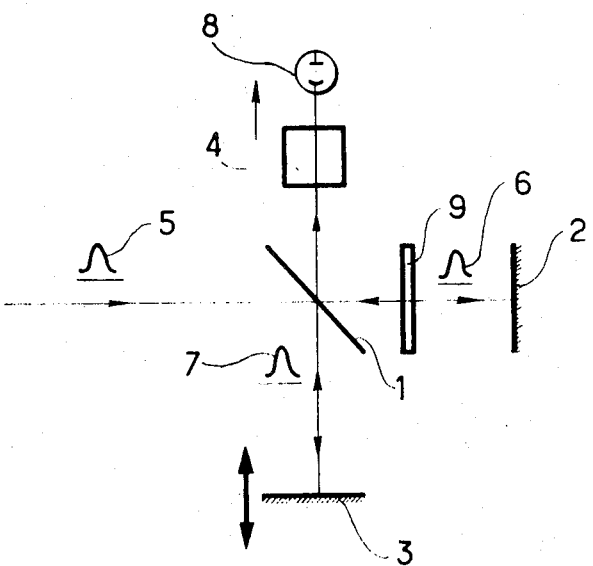
FIG. 1 represents schematically a measurement arrangement in accordance with the prior art.
Figure 2:
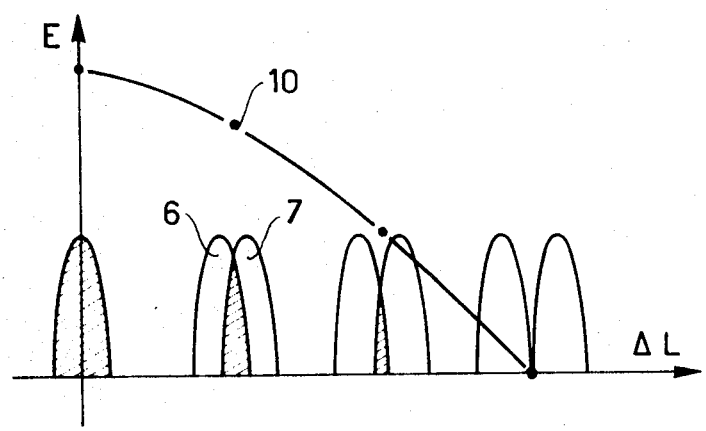
FIG. 2 is a diagram illustrating the known correlation process, in which it is easy to know the form and the duration of the light pulse.
Figure 3:
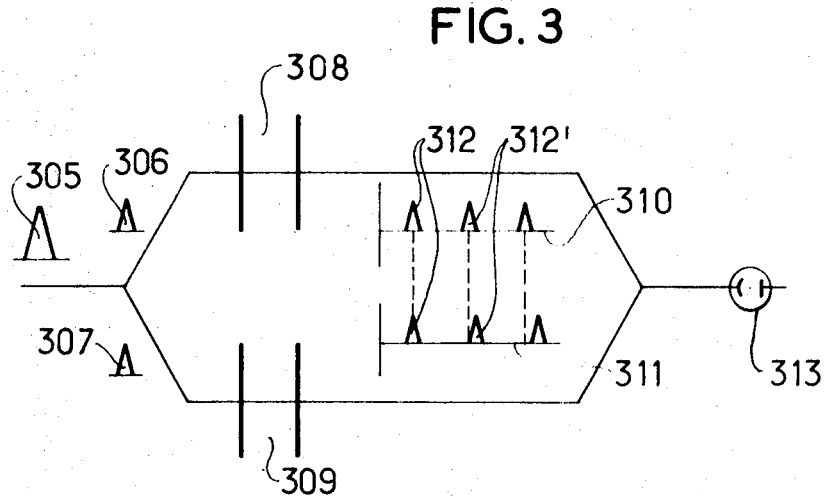
FIG. 3 is a diagram illustrating the measurement principle according to the invention.

According to the invention, a single pulse is necessary in order to permit its width to be defined, either in units of length or units of time. FIG. 3 is a diagram illustrating the principle of the means according to the invention, which permits the measurement by correlation of a light pulse of very short duration. A pulse 305 is separated into two half-pulses 306 and 307. These are directed to two optical delay lines 308 and 309, in order to produce two trains of light pulses 310 and 311, which are formed of a series of corresponding secondary pulses 312, 312'. The pulses of one train are offset relative to he pulses of the other train by a duration equal to the difference of the optical delays introduced by the lines 308 and 309. The pulses 312 and 312' of each train 310 and 311 are recombined and sent to a detector 313.

Figure 4:
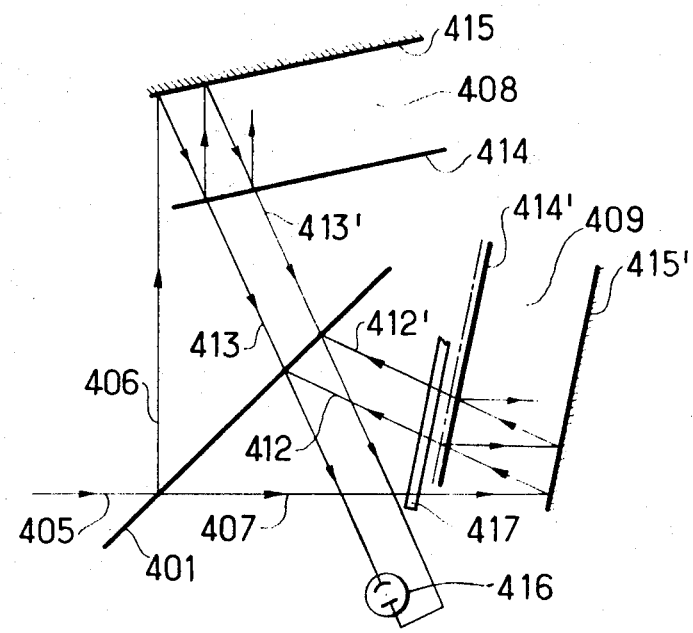
FIGS. 4 to 8 illustrate schematically different embodiments of the measurement means of the present invention.

In the embodiment which is illustrated in FIG. 4, the optical delay lines comprise two cavities 408 and 409, each formed by two parallel plane mirrors 414, 414' and 415, 415'. The mirrors 414 and 414' are semireflecting and the mirrors 415 and 415' are totally reflecting.

Operation is as follows: a light pulse 405 is divided by a semireflecting plate 401 into two half-pulses 406 and 407, which are respectively directed towards the cavities 408 and 409. The two cavities are advantageously inclined slightly on the perpendicular to the direction of propagation of the pulses, so that these latter penetrate into the interior of the cavity without being reflected by the external faces of the mirrors 414 and 414'. The pulses are reflected on the mirrors 415, 415' and are directed towards the mirrors 414, 414'. As these latter are semireflecting, some of the energy of the pulses is reflected by them, and the remainder is transmitted, and so on, which means that each cavity produces a series of light pulses 412, 412' and 413, 413'...

The cavities 408 and 409 are disposed symmetrically with respect to he semireflecting plate 401, so that the pulses 412, 413 emerging from the said cavities are brought on to a single optical path and fall on a detector 416 which is known per se.

In the case of FIG. 4, the mirrors 414 and 415 are located at a distance L−ΔL, being the distance separating the mirrors 414 and 415 of the cavity 408, and L being the difference in width of the cavities 408 and 409. In order to be able to measure this displacement, which can be either direction, the mirror 414' of the cavity 409 may be fixed to a support (not shown), which can be moved under the action of a micrometer screw.

In the case of FIG. 4, as the mirrors 415, 415' are symmetrical in relation to the plate 401, the pulses 412, 413 reach the detector 416 simultaneously; the pulses 412', 413' are staggered by a duration approximately equal to $2\Delta L/c$, because the inclinations of the cavities are very small. (In the Figure, these inclinations have been exaggerated to permit the path followed by the pulses to be shown.

By way of example, for a pulse having a duration equal to one picosecond at midheight, and for receiving five pulses on the detector 416, it is necessary, for defining the time of ascent of the pulse to be measured, to have approximately $$\Delta L = \frac{2.10^{-12} \times 3.10^{11}}{5 \times 2} = 6.10^{-2} \text{ mm}.$$

The distance between each measurement point is defined by the length L of the cavity, which can be of the order of a few centimeters.

As the detection is effected in this case by generation of the harmonic 2 in a KDP crystal, the light pulse 405 is polarized rectilinearly. For obtaining the correlation product between the pulses 412, 413 according to the process set forth above, a "quarter-wave plate" 417 is interposed along the path of the pulses 407 and 412, 412' and this plate, by double passage of a light pulse, causes the polarization of the initial light pulse 405 to turn through $\pi/2$.

Figure 5:
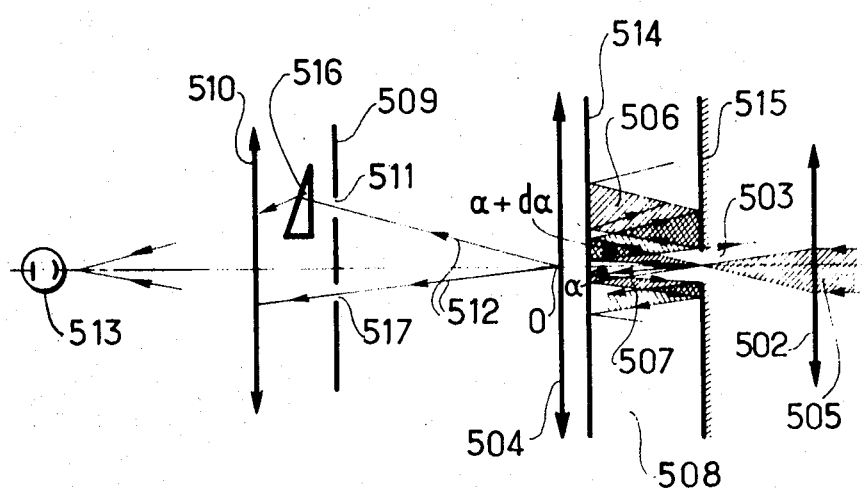
Figure 6:
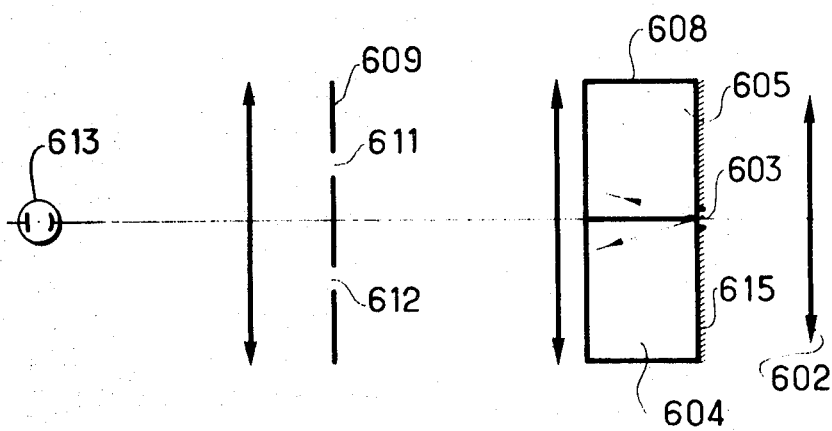

FIGS. 5 and 6 represent other embodiments of the detection or measuring means according to the invention, in which the detection is effected by multiplication of the pulses of the two outlet trains directly on a photomultiplier.

In the case of FIG. 5, the two delay lines are identical, the difference in optical path and the separation into two light half-pulses being obtained by angular differences $\alpha$ and $\alpha + d\alpha$. This arrangement comprises a convergent lens 502 receiving a single pulse 505, the axis of symmetry of this pulse being identical with the optical axis of the lens 502.

The cavity 508 is formed of two mirrors 514 and 515; the mirror 515 is totally reflecting and comprises a coupling hole 503 centered on the optical axis of the lens 502 and identical with the focus of the latter. Situated behind the semireflecting mirror 514 is a convergent lens 504 with the same optical axis as the lens 502. A screen 509 and a convergent lens 510 are arranged between he lens 504 and the photosensitive detector 513.

The screen 509 is formed with two holes 511 and 517. The positions of these holes are determined so that the angles formed by the optical axis of the lens 504 and the straight lines joining the optical center 9 of the said lens to the centers of the holes 511 and 517, respectively, are equal to $\alpha$ and $\alpha + d\alpha$, respectively.

The operation of this arrangement is as follows: the light pulse, being focused, enters the cavity 508 and produces two pulses 506 and 507, which diverge. The light which is focused on he holes 511 and 517 follows a different optical path and, for each pulse emerging from the cavity, there is an optical path displacement $$\Delta L = L \frac{1}{\cos(\alpha + \delta\alpha)} - \frac{1}{\cos \alpha}$$

L representing the length of the cavity.

The parts 512 of the pulses transmitted by the mirror 514 are focused on the holes 511 and 517. A prism 516 disposed behind the hole 511 compensates for the angular difference d. The corresponding pulses of each train are recombined on a single detector 513 by the lens 510.

In the embodiment according to FIG. 6, the light pulse is centered on the optical axis of a lens 602, and the optical path difference is given by cavity 608 divided into two fluidtight compartments 604 and 605 filled with the same gas, but at different pressures, this being equivalent to two media of different indices.

It would obviously be possible to change the nature of the gas and to fill each compartment with a different gas.

In the case of FIG. 6, the holes 611 and 612 of the screen 609 are symmetrical with respect to the optical axis of the complete arrangement.

The cavity 603 can be formed by two vessels with transparent walls, of which the face 615 is silvered so as to have a reflection coefficient as close as possible to 100 percent, except at the position 603, through which the light pulse penetrates into the interior of the cavity 608.

Figure 7:
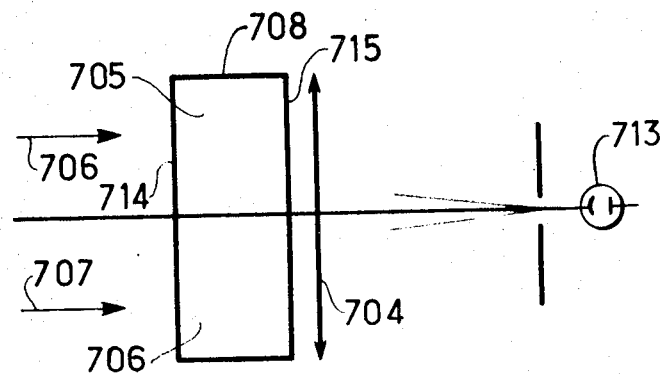
Figure 8:
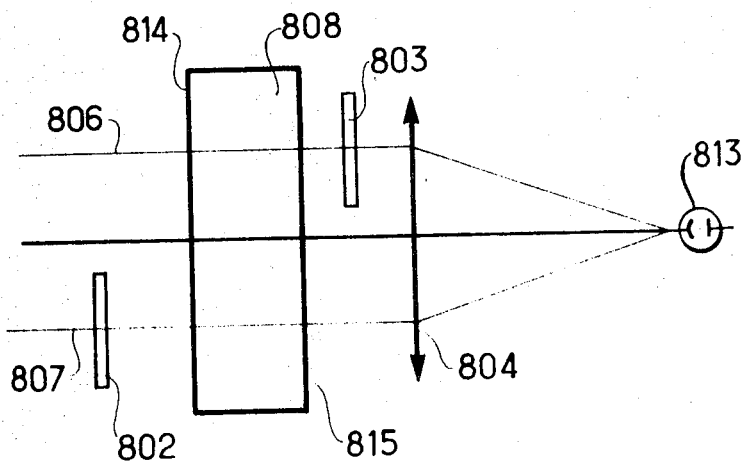

In the case of FIGS. 7 and 8, the light pulse of which it is desired to measure the duration is separated by any known means into two half-pulses, both of which fall at normal incidence on the entry faces of the optical delay lines.

In the embodiment according to FIG. 7, the two half-pulses 706 and 707 fall perpendicularly onto a cavity 708 formed of two fluidtight vessels 705 and 706 filled with gas at different pressures, this forming two media of different indices. The walls 714 and 715 of these vessels are lightly silvered to form two cavities. The pulses of the two trains emitted by the cavities are focused on a photomultiplier 713 by a convergent lens 704, the optical axis of which is parallel to the path of the light half-pulses falling on the common cavity 708.

In the embodiment according to FIG. 8, the two half-pulses 806 and 807 have for example their polarization planes parallel. By means of a "half-wave" plate 802, it is possible to cause the polarization plane of the half-pulses 807 to turn through $\pi/2$.

These two pulses with perpendicular polarization planes fall for example on an optical cavity 808 formed of a low-loss birefringent material, as for example a KDP crystal, a calcite ($CaCO_3$) crystal or a sodium nitrate crystal.

If the optical axes of the birefringent material are correctly oriented, the two pulses meet two different indices and are propagated at different speeds. The faces 814 and 815 of the crystal can be lightly silvered to form a cavity 808 and thus obtain the emission of the two pulse trains necessary for the measurement by correlation of the duration of the original pulse.

If the pulses emerging from the cavity have their polarization planes making an angle $\pi/2$, it is possible to cause the polarization plane of the pulses which are due to the half-pulse 806 to turn by means of a plate 803 which is advantageously of the "half-wave" type (in order to obtain the same optical path outside the cavity).

The pulses of the two outlet trains, then having their polarization planes parallel, can be multiplied by the photomultiplier 813, after having been focused on this latter by a lens 804.

The embodiments, which have been described above by way of example, either detect by harmonic generation or by direct multiplication on a photomultiplier.

It is indeed been specified that, in certain cases, detection by harmonic generation can be replaced by a direct detection by a photomultiplier, and vice versa, but in the case of detection by a photomultiplier, it is necessary for the difference in optical paths introduced by the two delay lines to be a multiple of the wavelength of the light being used, in order to avoid a shift in phase of the two waves of light pulses, which produces the danger of disturbing the measurement by a movement of interference fringes.

What is claimed is:

1. A device for measuring the duration of a short light pulse comprising:
   a. means for separating an initial light pulse into two half-pulses having substantially the same duration as said initial pulse,
   b. means for passing said half-pulses along two different optical paths,
   c. optical means for obtaining on respective different light paths corresponding secondary light pulse trains having substantially the same duration as said half-pulses,
   d. means for staggering each secondary pulse of one of said pulse trains with respect to corresponding pulses of the other pulse train, by a given proportional quantity, and
   e. means for superposing said pulse trains and a photosensitive detector arranged at the point of superposition.

2. The device according to claim 1, wherein said means for obtaining pulse trains comprise two different optical delay lines.

3. The device according to claim 2, wherein each delay line comprises two parallel plane mirrors, one of which is semireflecting and the other having total reflection.

4. The device according to claim 3, further comprising cavities inclined by a very small angle with respect to the perpendicular to the path of said half-pulses.

5. The device according to claim 3, wherein said means for separating the initial pulse into two half pulses comprises a semireflecting thin plate arranged substantially in the plane of bisection of the dihedron formed by the planes of said total reflection mirrors.

6. The device according to claim 3, further comprising a parallel face plate of the "quarter-wave" type, arranged between one of the cavities and the semireflecting plate.

7. The device according to claim 1, wherein the means separating the initial pulse into two half-pulses and said means for obtaining secondary pulse trains comprises a cavity involving a first, total reflection face, having an opening opposite of which there is arranged a first focusing means and a second semireflecting face, behind which are arranged second focusing means, a screen having two holes situated at different distances from the optical axis of said cavity and arranged essentially at the output of said second focusing means, and means diverting a light beam arranged opposite the perforation of said screen furthest removed from said optical axis.

8. The device according to claim 7, above, wherein said means for superposing the paths of the two pulse trains is a converging lens.

9. The device according to claim 1 above, wherein said means for breaking up the initial pulse into two half-pulses and said means for obtaining the two pulse trains, comprise two adjacent tanks with semireflecting walls whose entrance face has a layer that is opaque except in a central zone extending on either side of the wall separating the two adjacent tanks, said two tanks being filled respectively, with two fluids having a different refraction index, screen involving two axial holes situated at an equal distance from the plane defined by the separating wall between the two tanks and arranged behind said tanks.

10. The device according to claim 9, wherein said two fluids with the different refraction index are the same gas at different pressures.

11. The device according to claim 9, wherein the two fluids are different gases.

12. The device according to claim 1, wherein said means for obtaining two pulse trains, are two tanks whose walls are parallel and semireflecting with said tanks being filled with fluids having a different refraction index.

13. The device according to claim 1, wherein said means for obtaining the two light pulse trains, comprise a thin plate with a parallel face, made of birefringent material, two plates with parallel faces making it possible to turn, by 90° the plane of polarization of a light arranged on either side of said birefringent material plate, and one of the two first plates is arranged on the path of the pulse train corresponding to the other half-pulse.